United States Patent
Sebastiano et al.

(10) Patent No.: US 8,620,394 B2
(45) Date of Patent: Dec. 31, 2013

(54) METHOD AND SYSTEM FOR IMPULSE RADIO WAKEUP

(75) Inventors: Fabio Sebastiano, Eindhoven (NL); Salvatore Drago, Eindhoven (NL); Lucien Johannes Breems, Eindhoven (NL); Dominicus Martinues Wilhelmus Leenaerts, Riethoven (NL)

(73) Assignee: NXP, B.V., Eindhoven (NL)

( * ) Notice: Subject to any disclaimer, the term of this patent is extended or adjusted under 35 U.S.C. 154(b) by 767 days.

(21) Appl. No.: 12/681,093

(22) PCT Filed: Oct. 2, 2008

(86) PCT No.: PCT/IB2008/054037
§ 371 (c)(1),
(2), (4) Date: Mar. 31, 2010

(87) PCT Pub. No.: WO2009/044365
PCT Pub. Date: Apr. 9, 2009

(65) Prior Publication Data
US 2010/0216523 A1    Aug. 26, 2010

Related U.S. Application Data

(60) Provisional application No. 60/977,370, filed on Oct. 3, 2007.

(51) Int. Cl.
*H04M 1/00* (2006.01)
(52) U.S. Cl.
USPC .......................................... 455/574; 375/130
(58) Field of Classification Search
USPC ................. 455/574, 41.1, 343.5, 41.2, 426.1, 455/552.1, 73, 40
See application file for complete search history.

(56) References Cited

U.S. PATENT DOCUMENTS

| | | | |
|---|---|---|---|
| 5,621,412 | A | 4/1997 | Sharpe et al. |
| 5,790,946 | A | 8/1998 | Rotzoll |

(Continued)

FOREIGN PATENT DOCUMENTS

| | | | |
|---|---|---|---|
| EP | 0676727 | A2 | 10/1995 |
| EP | 1545069 | A1 | 6/2005 |
| GB | 2435365 | A | 8/2007 |
| WO | 2005/022760 | A1 | 3/2005 |
| WO | 2005057388 | A | 6/2005 |

OTHER PUBLICATIONS

Rabaey, J., et al; "Picoradios for Wireless Sensor Networks: The Next Challenge in Ultra-Low-Power Design"; Proceedings of the International Solid-State Conference (2002).

(Continued)

*Primary Examiner* — Charles Appiah
*Assistant Examiner* — Emem Stephen

(57) ABSTRACT

Communication networks are implemented using a variety of devices and methods. In a particular embodiment for use in a communication network having RF-communication devices that communicate using a RF protocol, an RF-communication device is implemented with an RF transceiver (110) to communicate over the network using the RF protocol and being controllable in a reduced power-consumption mode in which the RF transceiver does not communicate over the network. The device also includes an RF receiver (104, 106) including an envelope detector (104) and a pulse generator circuit (106). The envelope detector circuit (104) providing an envelope-based signal to a pulse generator circuit (106) that, in response to the envelope-based signal and after generating a number of pulses that exceeds a predetermined number of pulses, prompts the RF transceiver (110) to transition out of the reduced power-consumption mode.

14 Claims, 4 Drawing Sheets

(56) References Cited

U.S. PATENT DOCUMENTS

| | | | |
|---|---|---|---|
| 7,106,246 B1* | 9/2006 | Lindell | 342/51 |
| 7,392,044 B2 | 6/2008 | Hayes et al. | |
| 7,876,207 B2* | 1/2011 | Wada et al. | 340/447 |
| 2005/0058102 A1 | 3/2005 | Santhoff et al. | |
| 2006/0176837 A1 | 8/2006 | Son et al. | |
| 2007/0097895 A1 | 5/2007 | Keshavarzian et al. | |
| 2007/0110126 A1* | 5/2007 | Sekiguchi et al. | 375/130 |
| 2008/0031386 A1* | 2/2008 | Tsai et al. | 375/340 |

OTHER PUBLICATIONS

Daly, D.C., et al; "An Energy Efficient 00K Transceiver for Wireless Sensor Networks"; IEEE RFIC Symposium (2006).

Otis, B., et al; "An Ultra-Low-Power MEMS-Based Two-Channel Transceiver for Wireless Sensor Networks"; Symposium on VLSI Circuits (2004).

Cook, B.W., Lanzisera, S., Pister, C.S.J.; "SoC issues for RF Smart Dust"; Proc. IEEE, vol. 94; p. 1177-1196; 2006.

* cited by examiner

METHOD AND SYSTEM FOR IMPULSE RADIO WAKEUP

The present invention relates generally to implementing a radio-frequency wakeup and, more particularly, to wakeup via impulse radio based wakeups.

Wireless Sensor Networks (WSNs) include autonomous devices that are spatially distributed to collect data from the environment and to deliver them to the final user. For self-powered wireless sensors, reducing power consumption can be an important design constraint. A node typically sends and receives a packet of hundreds of bits in a period ranging from seconds to some minutes. Consequently, for nodes that do not reduce power consumption during idles states, the biggest fraction of the energy in each node is spent in idle listening to the channel (e.g., waiting for packets). Other key aspects are the reduced size and the very small cost of the nodes, which directly lead to the need of a complete integration of components into the nodes.

A reduction of the energy expended monitoring the channel can be obtained by duty-cycling the network nodes (putting them in sleep mode for a significant fraction of the time). Duty cycling may require a synchronization algorithm to ensure that all nodes experience simultaneous sleep and wake-up times. To deal with synchronization, some solutions focus on the use of a reactive radio, in which nodes have the capability to wakeup in response to a signal received from another node. A discussion of one such reactive radio can be found in J. Rabaey et al. (2002) "PicoRadios for Wireless Sensor Networks: The Next Challenge in Ultra-Low-Power Design," Proceedings of the International Solid-State Circuits Conference. The power consumption of such a wakeup radio should be less than the total available power, (e.g., 100 uW), and special architectures must also be adopted. Architectures are ideally as simple as possible, such as avoiding downconversion and complex baseband processing to reach the power target. However, if architectures that perform the channel filtering at baseband or at the intermediate frequency, such as super-heterodyne, low-IF or direct conversion, are not used, channel filtering is implemented using high-Q RF filters, such as bulk-acoustic-wave (BAW) filters or micro-electro-mechanical-system (MEMS) resonators. Example uses for these types of filters are discussed in D. C. Daly and A. P. Chandrakasan (2006) "An energy efficient OOK transceiver for wireless sensor networks", IEEE RFIC Symposium, and in B. Otis, Y. Chee, R. Lu, N. Pletcher and J. M. rabaey (2004) "An ultra-low-power MEMS-based two-channel transceiver for wireless sensor networks," Symposium on VLSI Circuits. In these and other solutions, channel filtering is still used to allow for ultra low power consumption. If channel filtering is not used and the bandwidth is not limited, the signal can be buried under the noise coming from the antenna and the noise added by the wakeup radio circuitry. The latter can be reduced at the expenses of higher power dissipation in the front-end. Thus, a trade-off exists in the design of wake-up radios between complete integration (i.e., to avoid channel filtering), and power consumption.

These and other limitations present challenges to the implementation of power management in wireless networks.

Various aspects of the present invention are directed to methods and arrangements for implementing processor power state transitions in a manner that addresses and overcomes the above-mentioned issues.

Consistent with one example embodiment, the present invention is directed to a radio frequency (RF) device for use in a communication network having RF-communication devices that communicate using a (RF) protocol. The RF-communication device is implemented with an RF transceiver to communicate over the network using the RF protocol and being controllable in a reduced power-consumption mode in which the RF transceiver does not communicate over the network. The device also includes an RF receiver including an envelope detector and a pulse generator circuit. The envelope detector circuit provides an envelope-based signal to a pulse generator circuit that prompts the RF transceiver to transition out of the reduced power-consumption mode. The prompting is in response to the envelope-based signal and after generating a number of pulses that exceeds a predetermined number of pulses.

Consistent with another example embodiment, the present invention is directed to a method for use in a communication network having radio-frequency (RF)-communication devices that communicate using a RF protocol. Each RF-communication device has an RF transceiver to communicate over the network using the RF protocol and is controllable in a reduced power-consumption mode in which the RF transceiver does not communicate over the network and an RF receiver. The method includes for one of the RF-communication devices, generating an envelope-based signal from an RF signal received by the RF receiver, detecting a valid RF impulse signal, in response to the envelope-based signal, and in response to detecting a valid RF impulse signal, prompting the RF transceiver to transition out of the reduced power-consumption mode.

Consistent with another example embodiment, the present invention is directed to an arrangement for use in a communication network having RF-communication devices that communicate using a RF protocol. Each RF-communication device has an RF transceiver to communicate over the network using the RF protocol and is controllable in a reduced power-consumption mode in which the RF transceiver does not communicate over the network and an RF receiver. The arrangement includes one of the RF-communication devices that has means for generating an envelope-based signal from an RF signal received by the RF receiver, means for detecting a valid RF impulse signal, in response to the envelope-based signal, and means for, in response to detecting a valid RF impulse signal, prompting the RF transceiver to transition out of the reduced power-consumption mode.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
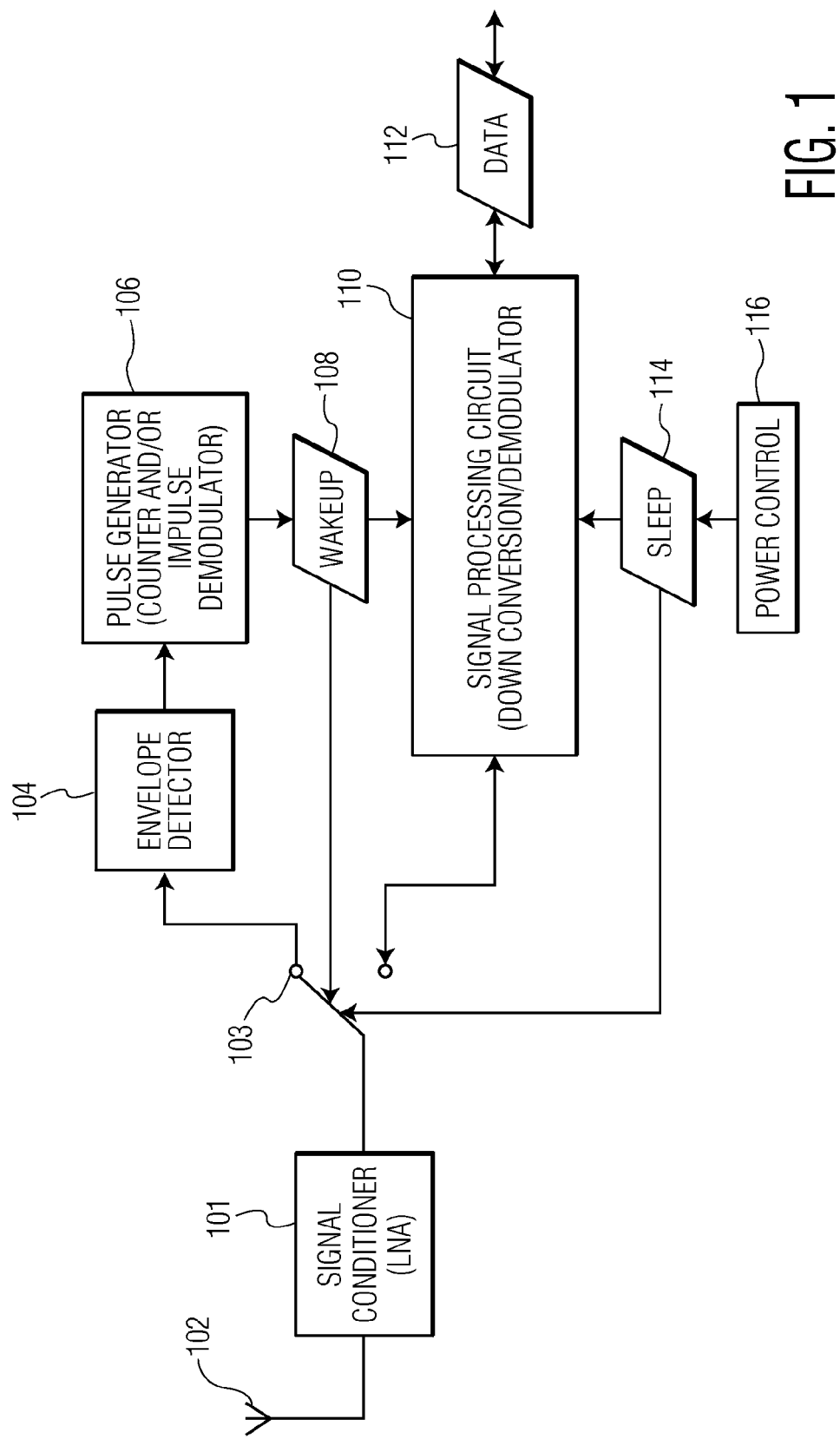
FIG. 1 shows a block diagram of a radio frequency (RF) device, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

The present invention is believed to be applicable to use with a variety of different wireless sensor networks. While the present invention is not necessarily limited to such applications, an appreciation of various aspects of the invention is best gained through a discussion of examples in such an environment.

Consistent with one embodiment of the present invention, a wireless communication device is implemented as part of a wireless network. The communication device has a wireless transceiver and signal processing circuit for communicating to other devices in the wireless network using a first communications protocol. The communications device is placed into a reduced power mode. A wireless signal detection circuit is used to detect a wakeup request that uses a second communications protocol, such as an RF impulse radio modulation. The communications device is removed from the reduced power mode in response to the detection of the wakeup request. This can be particularly useful for using a low power/cost detection circuit during idle communications times with respect to the first communications protocol.

Consistent with another example embodiment of the present invention, the detection circuit is implemented using an envelope detector. A signal provided from the envelope detector is used to determine when a wakeup transmission is being broadcast. In a specific instance, the signal from the envelope detector is compared against a threshold value to determine whether a wakeup transmission is present.

FIG. 1 shows a block diagram of an RF device, according to an example embodiment of the present invention. Antenna 102 receives transmissions from a wireless network of devices. In necessary or desired, front-end signal conditioning circuit 101 can be used. A specific example of signal conditioning circuit is a low noise amplifier (LNA). Switch 103 can be optionally implemented to selectively connect antenna 102 to either envelope detector 104 or to signal processing circuit 110. The switch 103 is responsive to the power state of the signal processing circuit 110. In sleep (reduced power) mode, the switch connects antenna 102 to envelope detector 104. In wakeup (normal) mode, the switch connects antenna 102 to signal processing circuit 110. In some instances, no switch is necessary; instead, the antenna can be connected to both envelope detector 104 and signal processing circuit 110 at the same time.

Envelope detector 104 detects the envelope of a received signal. The envelope of a signal is representative of the amplitude of the signal in a manner that is relatively independent of the underlying (carrier) frequency of the signal. To communicate with the wireless device shown in FIG. 1, another wireless device will transmit a wakeup signal. This wakeup signal is defined by the envelope of the transmitted signal. In a particular embodiment, the wakeup signal includes a series of pulses that are defined by the envelope of the transmitted signal exceeding a threshold for a given period of time. In another embodiment, the wakeup signal can be transmitted as (part of) a preamble of a data packet. The envelope detector passes the detected envelope to a pulse counter 106. The pulse counter 106 records the number of received pulses and generates a wakeup signal once it is determined that a wakeup signal has been received.

Figure 2:
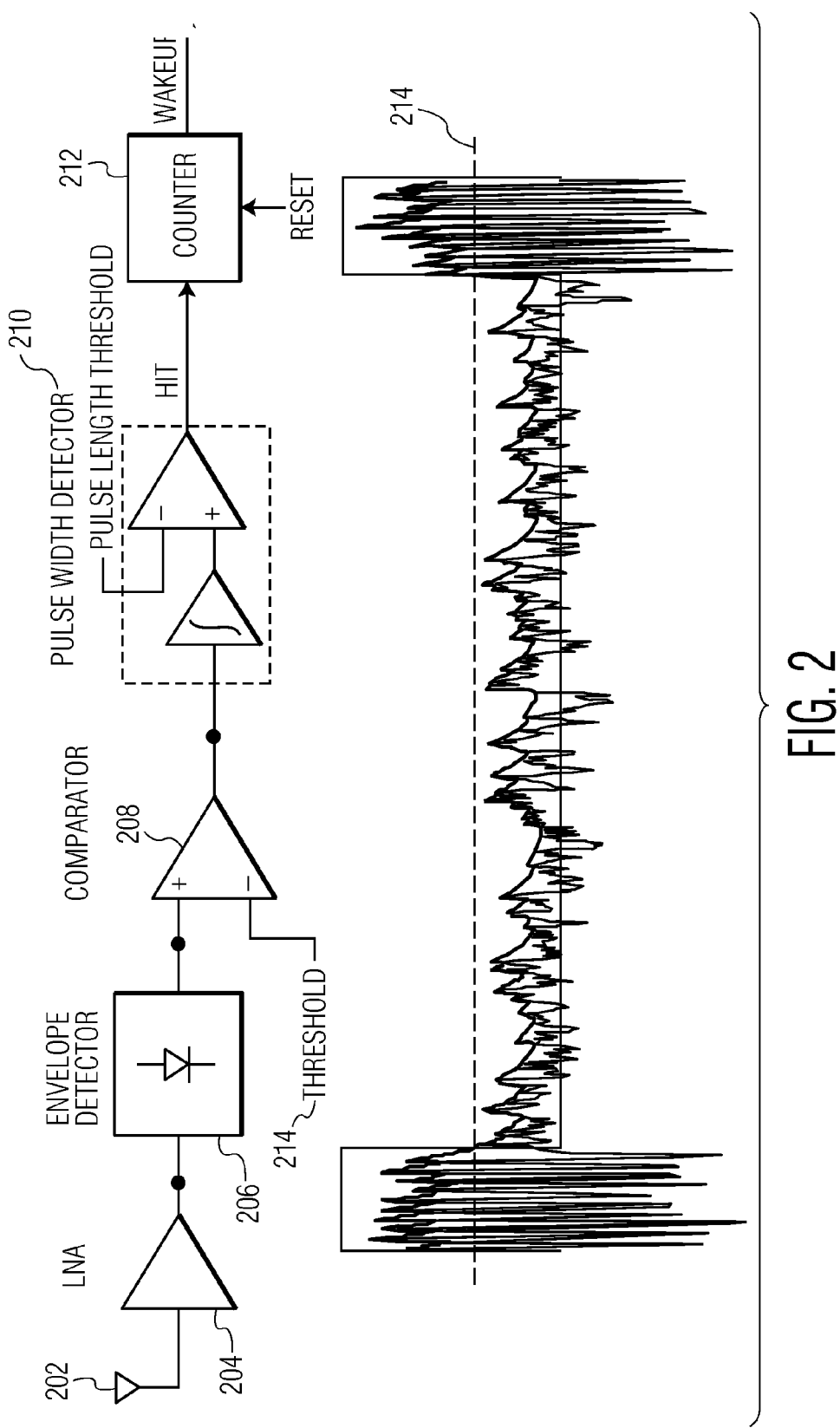
FIG. 2 shows an example configuration of a circuit for generating a wakeup signal and waveforms of signals generated therefrom, according to an embodiment of the present invention.

FIG. 2 shows an example configuration of a circuit for generating a wakeup signal, according to an embodiment of the present invention. Antenna 202 receives radio-frequency signals and provides them to low-noise amplifier (LNA) 204. Envelope detector 206 provides an envelope-based signal to comparator 208. Comparator 208 is configured to provide a comparison of the envelope-base signal to a threshold value 214. The output of comparator 208 is used by pulse-width detector 210 to determine if a valid pulse has been received. Counter 212 records the number of valid pulses received. In response to a sufficient number of valid pulses, counter 212 generates a wakeup signal for the main receiver (radio). Counter 212 can be reset once a wakeup signal is received, the main receiver enters a power-save mode or if a valid pulse is not received within a sufficient time period.

The particular embodiment shown in FIG. 2 depicts the pulse width detector 210 as an integrator and comparator combination. This embodiment is not meant to be limiting and can be replaced or supplemented by a number of different circuits that function to verify that a valid pulse has been received. For instance, the circuit can be configured to verify that a received pulse does not exceed a certain length before a valid hit is sent to the counter 212. In another instance, the circuit can be configured to verify that there is a sufficient timing delay between subsequent pulses.

When an appropriate voltage threshold is chosen for the comparator and the noise is low enough, the output of the comparator is a square wave consistent with the shape of the envelope of the IR signal. As discussed above, the pulse detector receives the square wave and recognizes pulses longer than a certain threshold as signal. This precaution protects the system from false pulse detection due to short and high noise peaks. The pulse detector has a digital output (Hit), which is high when a pulse is detected and low otherwise. The Hit signal is sampled on each pulse period ($T_f$) and its value is accumulated in the counter. After the observation of n periods $T_f$, the number of hits, i.e. the number of times a pulse was detected in the n frames, is present in the counter. If n hits have been detected, a wakeup signal is generated to turn on the main radio; otherwise the count is reset and the procedure begins again.

When interference is present, false alarms can be produced if the level of interferers is high enough to produce a voltage level above the threshold at the input of the comparator of FIG. 2. Consequently, given a fixed power for a particular interferer, false alarms can be avoided increasing the threshold. If the threshold is increased, also the signal power may need to be increased to avoid missed detections of incoming data. This can be achieved, for example, by reducing the distance between each couple of communicating nodes in the network.

Figure 3:
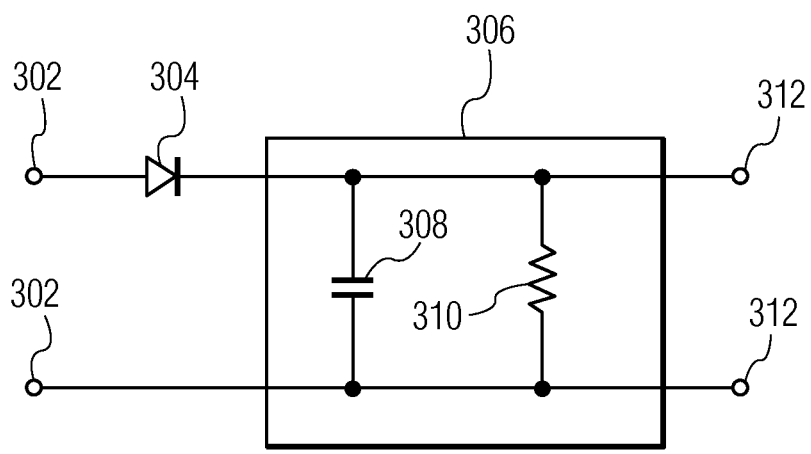
FIG. 3 shows an example circuit for providing envelope detection, according to an example embodiment of the present invention.

FIG. 3 shows an example circuit for providing envelope detection according to an example embodiment of the present invention. RF signals are received on inputs 302. Diode 304 rectifies the received signals, thereby generating an envelope-based signal from the received RF signals. Filter 306 can be optionally implemented to smooth or otherwise condition the envelope-based signal. In this specific embodiment, FIG. 3 shows the filter circuit as an RC circuit that includes capacitor 308 and resistor 310. This specific embodiment of the filter circuit is not meant to be limiting as various filtering circuits and techniques can be used depending upon the desired filter requirements. The resulting envelope-based signal is provided on outputs 312. The selection of the filter circuit characteristics can involve a trade-off between fast response and a smooth waveform of the envelope.

Figure 4:
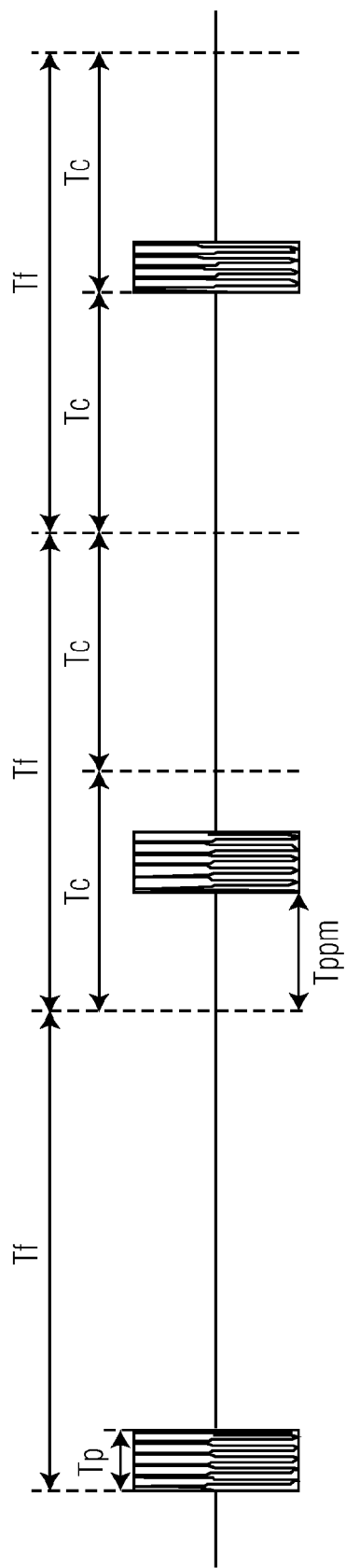
FIG. 4 shows the time representation the transmitted wakeup (impulse) signal, according to an example embodiment of the present invention.

FIG. 4 shows the time representation of the transmitted wakeup (impulse) signal, according to an example embodiment of the present invention. A carrier at RF frequency is modulated by a pulse waveform with period $T_f$ and duty cycle $T_p/T_f$, realizing an Impulse Radio (IR). As shown in the figure, the pulses are shaped as square waves with duration $T_p$ and pulse repetition frequency (PRF)=1/$T_f$. Each bit is represented by a sequence of n=PRF/DR successive pulses, where DR is the data rate.

In the embodiment shown by FIG. 4, the bits are modulated using Pulse Position Modulation (PPM); also other modulation schemes can be adopted, such as on-off keying (OOK) or binary phase-shift keying (BPSK). In each frame $T_f$ the pulse can be transmitted with different delays. The delay can be determined based upon both the modulating bitstream and the time-hopping scheme. Each frame $T_f$ is divided in a number of chips of duration $T_c$ (two in the figure). The chip in which each pulse is transmitted can be chosen according to a pseudorandom word to implement a time hopping scheme. Each single transceiver or each group of transceivers can be identified by a pseudorandom word, to reduce multi-user interference. Within each chip, the pulse can be positioned with zero delay (bit 0) or with delay $T_{ppm}$ (bit 1), in case of binary modulation. In other instances, additional delays can be implemented to employ an M-array modulation.

Since the peak power of the pulses is higher than the average power of the incoming signal, the wakeup radio is able to discriminate in the amplitude domain a useful signal from noise in an efficient manner. In this way, the duty cycle approach can be particularly useful with respect to the amount of power available and therefore facilitates the design of a wakeup radio without narrow filtering. This can allow for the use of a relatively simple architecture of wakeup radio circuit and facilitate the integration of the radio into a single integrated circuit (IC) die, as the use of high Q filters that are difficult to implement into the IC die, such as BAW filters and MEMS filters, can be avoided.

Some WSNs are characterized by dense spatial distribution and in that each node has the possibility to communicate both with far nodes, (e.g., 10 m), and with near nodes, (e.g., 1 m or less). Using the maximum level of interferers that the wakeup radio is expected to tolerate, the network protocol imposes the maximum range (d) at which the nodes communicate. Given this maximum distance between a transmitting node and a receiving node and hence the relative path loss, the signal power at the receiver antenna can be computed and the threshold in the wake-up radio can be set accordingly. When reducing the communication range, data that need to be delivered to nodes at a distance larger than d can be routed using the multi-hop approach. This allows the nodes to be spaced in excess of the distance d so long as there is a path of nodes each within the maximum distance d of one another. Such modification of the maximum distance d is particularly useful for use with transmitters with peak transmission amplitudes that are independent from their communication range.

By modifying the distance d, the immunity of the system to interferers can be dynamically adapted to different interferer scenarios, thereby trading off communication range for reliability in presence of interferers. The reduction of the communication range between the nodes can degrade the network performance by increasing the latency of each packet where multi-hop communication is used in place of single-hop communication (e.g., due to additional latency). However, if the application requirements can still be satisfied with the reduced latency performance, the system can be configured to function in harsh interferer environments, such as those environments that can be present in unlicensed bands.

In the previous description of architecture of FIG. 2, it was stated that a hit is given when a pulse is detected. Additional information can be extracted from the incoming signal using the same hardware plus a timing reference, such as the time at which a hit is detected. Observing the inter-arrival times of successive pulses, the wakeup radio can recognize the time hopping scheme employed in the incoming signal. Thus, knowing the pseudorandom word used in the time-hopping scheme at the transmitter, the wakeup radio can determine if the detected signal is useful and if the main radio must be turned on. In this way, interferers and impulse radio signal modulated with different pseudo random words can reduce or eliminate the generation of false alarms.

The wakeup radio can be configured for use with a time-hopping scheme that modulates the impulse signals. Specifically, the wakeup radio is configured to measure the time of arrival of the different pulses of the received signal. Different patterns can be used in the pulse sequence, such as periodic repetition of the same pulse, pseudorandom time-hopping or any deterministic time-hopping sequence. The recognition of the particular time-hopping scheme enables the wakeup radio to better discriminate between interferers and useful signals. A specific time-hopping scheme can be employed according to the particular recipient of each packet. This allows the wakeup radios of the listening nodes can identify whether to wakeup the main radio by the identification of the time-hopping scheme in the signal. More specifically, the wakeup radio can determine if it is the packet's intended destination.

This idea can be exploited both to increase the immunity to interferers and to implement complex network schemes in which the wakeup radio can directly extract some information from the time-hopping sequence. For example, if a specific time-hopping scheme is employed according to the particular recipient of the packet, the wakeup radio can recognize if the detected signal is directed to that particular node or not.

In a particular instance, the main radio synchronizes in frequency and symbol timing to correctly demodulate the received signal. When using a low data rate, the adoption of standard modulations, such as OOK, FSK or QAM, can require very tough specifications on frequency accuracy at RF due to the frequency accuracy required at the receiver being directly proportional to the bandwidth of the signal. With some of the modulation schemes discussed herein, frequency accuracy requirements are relaxed, as impulse modulated signal can have a bandwidth much larger than the data rate. In a specific example the main transceiver 110 operates using impulse radio modulation. This can be particularly useful for integrating a less precise oscillator or other reference signal generator.

As an example, the following modulation parameters can be adopted: $T_f$=476 ns, $T_p$=50 ns, $T_{ppm}$=238 ns, data rate of 100 kbps, 21 pulses per bit and a carrier frequency at 2.45 GHz. In a practical case, an error of ±8.4 MHz can be tolerated at the receiver with respect to the incoming signal frequency if a loss in received signal energy of 3 dB can be accepted.

The relaxation on the frequency accuracy at RF can be particularly useful for implementations of a less precise frequency synthesizer that can be completely integrated with the receiver. One embodiment employs an RF voltage controlled oscillator (VCO) tuned in a frequency-locked loop (FLL) to a low frequency oscillator circuit. Due to the relaxed accuracy requirements, the low frequency oscillator circuit can be implemented without an external reference, such as a quartz oscillator.

In narrowband modulation schemes, such as OOK, FSK, QAM, the bandwidth of the transmitted RF signal is proportional or of the same order of magnitude of the modulating signal. For example, to transmit a signal with a bandwidth of 100 kHz using OOK modulation, the RF bandwidth occupies 100 kHz around the frequency of the carrier. When demodulating such narrowband modulated signal, the frequency error at the receiver should be smaller than the bandwidth of the RF signal. Thus, if very low data rate is employed, the bandwidth of the modulating signal is small and consequently the RF bandwidth is also small (i.e., relative to the order of magnitude of the data rate). Accordingly, the frequency of the receiver should, generally, be near to the frequency of the received signal within a small error (i.e., of the order of magnitude of the data rate). For impulse radio modulation, if the data rate is low, the bandwidth of the RF signal can be made independent of the bandwidth of the modulating signal and the error allowed at the receiver is bigger than in the case of narrowband modulation. Accordingly, while the RF carrier can be the same for narrowband modulations and impulse radio modulation, the accuracy required in the latter case can be relaxed, (i.e., less precision needed).

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, applications other than sensors may be amenable to implementation using similar approaches. In addition, one or more of the above example embodiments and implementations may be implemented with a variety of approaches, including digital and/or analog circuitry and/or software-based approaches. The above example embodiments and implementations may also be integrated with a variety of circuits, devices, systems and approaches including those for use in connection with cellular phones, laptop computers and handheld computing devices. These approaches are implemented in connection with various example embodiments of the present invention. Such modifications and changes do not depart from the true scope of the present invention that is set forth in the following claims.

What is claimed is:

1. A RF-communication device comprising:
   a RF transceiver to communicate over a communication network using a RF protocol and being controllable in a reduced power-consumption mode in which the RF transceiver does not communicate over the network; and
   a RF receiver including an envelope detector and a pulse generator circuit, the envelope detector circuit providing an envelope-based signal to a pulse generator circuit that, in response to the envelope-based signal and after generating a number of pulses that exceeds a predetermined number of pulses, prompts the RF transceiver to transition out of the reduced power-consumption mode,
   wherein the pulse generator circuit comprises a comparator to compare the envelop-based signal to a threshold voltage, wherein the threshold voltage is a function of a maximum distance between communicating devices in the communications network;
   wherein the RF receiver includes a timing circuit to record pulse timings of the generated pulses and to compare the recorded pulse timings to predetermined pulse timing for the RF-communication device.

2. The device of claim 1, wherein the RF transceiver and the RF receiver use the same antenna.

3. The device of claim 1, wherein the pulse generator circuit determines if a pulse is valid pulse by monitoring the duration of the pulse.

4. The device of claim 1, wherein the envelope detector is a diode envelope detector.

5. The device of claim 1, wherein the pulse generator circuit includes a pulse counter that counts the generated pulses.

6. The device of claim 1, wherein the predetermined pulse timing identifies the RF device and is one of a periodic repetition of a pulse, a pseudorandom time-hopping sequence and a deterministic time-hopping sequence.

7. The device of claim 1, wherein the RF protocol used by the RF transceiver is an impulse radio protocol.

8. The device of claim 1, wherein the device is self-powered and includes a sensor that does not include monitoring of the communication network.

9. The device of claim 1, wherein both the transceiver and receiver are located on the same integrated-circuit die.

10. The device of claim 9, wherein the transceiver and receiver do not use an oscillator that is external to the integrated-circuit die.

11. A RF-communication device having a RF transceiver to communicate over a communication network using a RF protocol and being controllable in a reduced power-consumption mode in which the RF transceiver does not communicate over the network and an RF receiver, the reduced power consumption mode for one of the RF communication devices comprising:
   generating an envelope-based signal from an RF signal received by the RF receiver;
   detecting a valid RF impulse signal, in response to the envelope-based signal, wherein detecting a valid RF impulse signal includes comparing of the envelope-based signal to a threshold voltage that is determined as a function of a maximum allowable distance between communicating devices; and
   in response to detecting a valid RF impulse signal, prompting the RF transceiver to transition out of the reduced power-consumption mode;
   wherein the step of detecting a valid RF impulse signal includes comparing timings of received pulses to predetermined pulse timings for the RF-communication device.

12. The method of claim 11, wherein the step of detecting a valid RF impulse signal includes a comparison of the envelope-based signal to a minimum pulse duration.

13. The method of claim 11, wherein the step of detecting a valid RF impulse signal includes a comparison of the envelope-based signal to a minimum pulse duration.

14. The method of claim 11, wherein the predetermined pulse timings are one of a periodic repetition of a pulse, a pseudorandom time-hopping sequence and a deterministic time-hopping sequence.

* * * * *